United States Patent
Bailey

(10) Patent No.: US 6,715,568 B1
(45) Date of Patent: Apr. 6, 2004

(54) LATEX ADDITIVE FOR WATER-BASED DRILLING FLUIDS

(75) Inventor: Louise Bailey, Cambridgeshire (GB)

(73) Assignee: M-I L.L.C., Houston, TX (US)

( * ) Notice: Subject to any disclaimer, the term of this patent is extended or adjusted under 35 U.S.C. 154(b) by 41 days.

(21) Appl. No.: 10/030,674

(22) PCT Filed: Jul. 11, 2000

(86) PCT No.: PCT/GB00/02684
§ 371 (c)(1),
(2), (4) Date: Apr. 2, 2002

(87) PCT Pub. No.: WO01/04232
PCT Pub. Date: Jan. 18, 2001

(30) Foreign Application Priority Data

Jul. 13, 1999 (GB) .............................. 9916264

(51) Int. Cl.[7] .......................... C09K 7/02; E21B 21/00; E21B 33/138

(52) U.S. Cl. ........................... 175/72; 175/65; 507/118; 507/119; 507/120

(58) Field of Search ........................... 166/295; 175/65, 175/72; 507/118, 119, 120, 140, 221, 224, 225

(56) References Cited

U.S. PATENT DOCUMENTS

| | | | |
|---|---|---|---|
| 4,301,016 A | | 11/1981 | Carriere et al. |
| 4,384,096 A | | 5/1983 | Sonnabend |
| 4,385,155 A | | 5/1983 | Michaels |
| 4,425,461 A | * | 1/1984 | Turner et al. ............... 507/120 |
| 4,486,316 A | | 12/1984 | Carriere et al. |
| 4,525,522 A | | 6/1985 | Turner et al. |
| 4,537,688 A | | 8/1985 | Peiffer et al. |
| 4,579,669 A | * | 4/1986 | Walker et al. .............. 507/119 |
| 4,600,515 A | | 7/1986 | Gleason et al. |
| 4,657,943 A | | 4/1987 | Wietsma |
| 4,670,501 A | * | 6/1987 | Dymond et al. ............. 524/458 |
| 4,740,319 A | | 4/1988 | Patel et al. |
| 4,777,200 A | * | 10/1988 | Dymond et al. ............. 524/458 |
| RE33,008 E | * | 8/1989 | Ruffner et al. .............. 526/270 |
| 4,978,461 A | | 12/1990 | Peiffer et al. |
| 5,518,996 A | | 5/1996 | Maroy et al. |
| 5,588,488 A | | 12/1996 | Vijn et al. |
| 5,770,760 A | | 6/1998 | Robinson |
| 5,913,364 A | * | 6/1999 | Sweatman .................. 166/281 |
| 6,258,757 B1 | * | 7/2001 | Sweatman et al. .......... 507/219 |

FOREIGN PATENT DOCUMENTS

| | | |
|---|---|---|
| DE | 201478 | 8/1981 |
| EP | 0875657 | 11/1998 |
| EP | 0875658 | 11/1998 |
| EP | 1024154 | 8/2000 |
| GB | 2131067 | 6/1984 |

OTHER PUBLICATIONS

C.M. Blow et al., "Raw Polymeric Materials", Rubber Technology and Manufacture, (1982), p. 96.

L.J. Fraser et al., "Mechanistic Investigation of the Formation Damaging Characteristics of Mixed Metal Hydroxide Drill–In Fluids and Comparison With Polymer–Base Fluids", SPE 30501 SPE Annual Technical Conf. and Exhibition, Dallas, TX, Oct. 22–25, 1995.

* cited by examiner

Primary Examiner—George Suchfield
(74) Attorney, Agent, or Firm—Dann, Dorfman, Herrell and Skillman, P.C.

(57) ABSTRACT

The use of polymer latices is described for fluid loss control in water-based drilling fluids. The latices used are water insoluble. The latices are essentially non-swelling in an aqueous solution. The latices are selected from known latices such that they are absorbed within a filter cake building up at the interface between the wellbore and porous formations in essentially the same state as they are in the aqueous drilling fluid during circulation.

14 Claims, 3 Drawing Sheets

LATEX ADDITIVE FOR WATER-BASED DRILLING FLUIDS

This invention relates to a latex additive for wellbore drilling fluids. More specifically, it pertains to an additive for reducing the loss of drilling fluid into the formations surrounding the wellbore.

BACKGROUND OF THE INVENTION

For the production of hydrocarbon wells, boreholes are drilled into subterranean formations. Following standard procedures, a fluid is circulated during drilling from the surface through the interior of the drill string and the annulus between drill string and formation. The drilling fluid, also referred to as "drilling mud", is used to accomplish a number of interrelated functions. These functions are:

(1) The fluid must suspend and transport solid particles to the surface for screening out and disposal;
(2) It must transport a clay or other substance capable of adhering to and coating the uncased borehole surface, both (a) to exclude unwanted fluids which may be encountered, such as brines, thereby preventing them from mixing with and degrading the rheological profile of the drilling mud, as well as (b) to prevent the loss of downhole pressure from fluid loss should the borehole traverse an interval of porous formation material;
(3) It must keep suspended an additive weighting agent (to increase specific gravity of the mud), generally barites (a barium sulfate ore, ground to a fine particular size), so that the entire column of drilling fluid is not interrupted upon encountering pressurized pockets of combustible gas, which otherwise would tend to reduce downhole pressure, as well as creating a "blowout" in which the fluid and even the drill stem are violently ejected from the well, with resulting catastrophic damages, particularly from fires;
(4) It must constantly lubricate the drill bit so as to promote drilling efficiency and retard bit wear.

The industry distinguishes between largely three classes of drilling fluids: oil-based, water-based and so-called synthetic muds. Whereas oil-based muds are recognized for their superior qualities for most of the drilling operations themselves, they become increasing undesirable due to their impact on the environment and stricter environmental legislation. Water-based muds are expected to replace oil-based mud as the drilling fluid of choice in major geographical areas.

A drilling fluid typically contains a number of additives. Those additives impart desired properties to the fluid, such as viscosity or density. One class of additives is used as fluid loss agents to prevent the drilling fluid from entering into porous formations.

The basic mechanism of fluid loss control is generally the formation of a filter cake at the interface of the porous or permeable formation layers. As part of the drilling fluid is forced into the formation by the higher pressure within the wellbore, larger particles and additives are left behind and accumulate at the face of the formation. The filter cake thus formed can be regarded as a membrane that protects the formation from further invasion of wellbore fluids. Fluid-loss control agents are selected in view of their quality to form a competent filter cake.

Known examples of such fluid-loss control agents are water-soluble polymeric additives added to the drilling fluid to improve the sealing of the filter cake. These fluid-loss polymers are most commonly modified celluloses, starches, or other polysaccharide derivatives and are subject to temperature limitations. In particular, most start to fail around 105–120 degrees C.

Latices on the other hand are described for example in the U.S. Pat. No. 5,770,760 using latex to thicken water-based drilling fluids. The latex is added to the mud and chemically treated to produce the functional polymer that is in a solubilized form.

The use of latices for the purpose of fluid loss control is described for example in the U.S. Pat. Nos. 4,600,515 and 4,385,155. In those applications, however, polymer latices are used in a water-soluble form.

It is therefore an object of the present invention to provide a novel class of fluid loss agents for drilling fluids.

SUMMARY OF THE INVENTION

The invention comprises the use of polymer latices for fluid loss control in water-based drilling fluids. The latices used are water insoluble. Preferably, the latices are essentially non-swelling in an aqueous solution.

The latices are selected from known latices such that they are absorbed within a filter cake building up at the interface between the wellbore and porous formations in essentially the same state as they are in the aqueous drilling fluid. Hence the latices used for this application are not coagulated or further crosslinked.

Another selection criterion for suitable latices is that the Tg, or glass transition temperature of the polymer must be lower than the temperature of the drilling application so that the polymer is in a rubbery or fluid state. In this state the polymer particles are deformable which improves the sealing characteristics of the filter cake.

The polymer latices can be of any water insoluble polymers, copolymers or terpolymers, for example synthesized by emulsion polymerization. The main chemical types can be summarized as:

Polymers and copolymers in which the principal repeat units are derived from monoolefinically-unsaturated monomers such as vinyl acetate, vinyl esters of other fatty acids, esters of acrylic and methacrylic acids, acrylonitrile, styrene, vinyl chloride, vinylidene chloride, tetrafluoroethylene and related monomers.

Polymers and copolymers in which the major proportion of the repeat units are derived from 1,3-dienes such as 1,3-butadiene (butadiene) 2-methyl-1,3-butadiene (isoprene) and 2-chloro-1,3-butadiene (chloroprene), with smaller proportions of the repeat units being derived from the monoolefinically unsaturated monomers such as styrene and acrylonitrile, or others of category 1.

Other polymers such as polyisobutenes containing minor amounts of copolymerised isoprene, polyurethanes and other monomer units.

Latices used for the purpose of the present invention include but are not restricted to styrene-butadiene copolymer latex (SBR), and styrene-acrylate-methacrylate terpolymer latex (SA).

Compatibility with other solids present in the drilling fluids may require the use of an additional stabilizer as additive to the water based drilling fluid. This may be the case for certain types of SBR latices. SA latices appear stable at ambient and moderate temperatures (to ca. 60C) but become destabilized at elevated temperatures. Other latex chemistries may be more stable. The stabilizer is generally added at a dosage of 10% of the latex concentration or less. Care must be taken in selection to minimize formation damage from free stabilizer. The most effective stabilizers are anionic surfactants typified by sodium docdecyl sulphate (SDS), Aerosol OT (AOT), and polymeric stabilizers/ surfactant such as NPE (a 30% aqueous solution of ammonium salt of sulfated ethoxylated nonylphenols). Nonionic surfactants such as the Triton series, an octylphenol polyether alcohol with varying numbers of ether linkages per molecule, commercially available from Union Carbide. Synperonics can also be used to stabilize the latex.

Further additives as known in the art may be added to impart other desired properties to the mud system. Such known additives include viscosifying agents, filtrate reducing agents, and weight adjusting agents. Other preferred additives are shale-swelling inhibitors, such as salts, glycol-, silicate- or phosphate-based agents, or any combination thereof.

These and other features of the invention, preferred embodiments and variants thereof, possible applications and advantages will become appreciated and understood by those skilled in the art from the following detailed description and drawings.

MODE(S) FOR CARRYING OUT THE INVENTION

Several different water insoluble latices were tested for their use as fluid loss additives.

Firstly, their filtration properties were examined using a ½ area API HTHP filter press as function of temperature and pressure. Typically pressures in the range 100–500 psi and temperatures of 25C to 150C were used. The cumulative fluid loss after 30 minutes was used to characterize the filtration performance.

Figure 1:
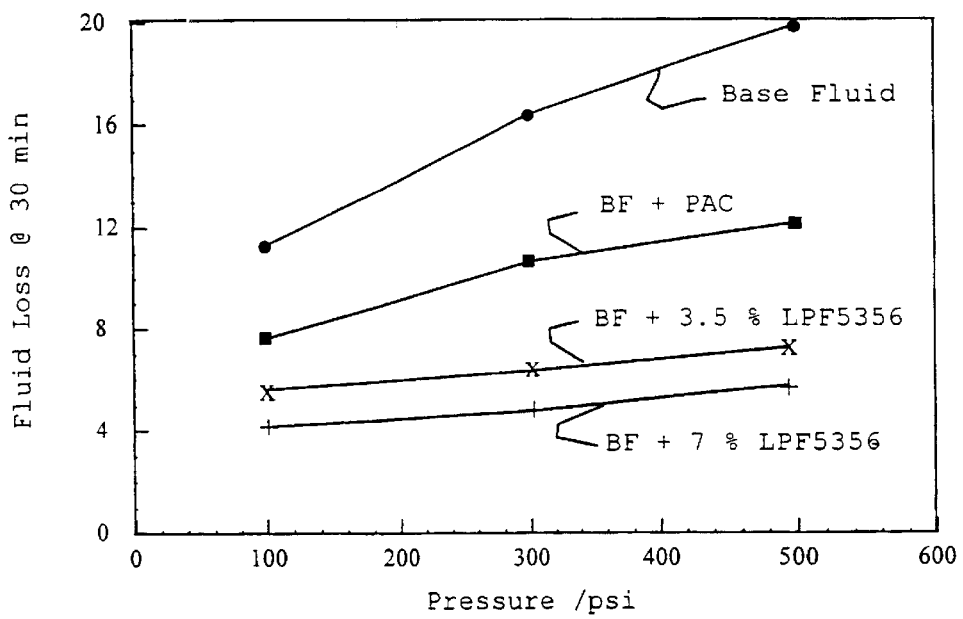
FIG. 1 compares polymeric and latex fluid loss additives showing the cumulative Fluid loss at 30 minutes at 25C as a function of applied differential pressure.

A lightly weighted polymer based fluid, consisting of 4 g/l Xanthan gum (IDVIS), 160 g/l API barite, adjusted to pH 8 with NaOH was used as the base system for these tests. FIG. 1 compares the filtration performance at 25C of a stabilized SBR latex, with a conventional fluid loss polymer: polyanionic cellulose (PAC). The latex, coded LPF5356, is a styrene-butadiene latex with a Tg of ~–20C and commercially available as Pliolite LPF5356 from GOODYEAR. The latex is polydisperse with a particle size range of 100–600nm. The latex slurry was added to the base formulation at 3.5% or 7% active with nonionic surfactant Triton X405 at 10% of the latex concentration. The PAC was added to the control system at a concentration of 5 g/l. The graph shows much lower fluid loss for the latex than for the conventional polymeric additive, with much less pressure dependence. The latex particle improves sealing in the filter cake.

Figure 2:
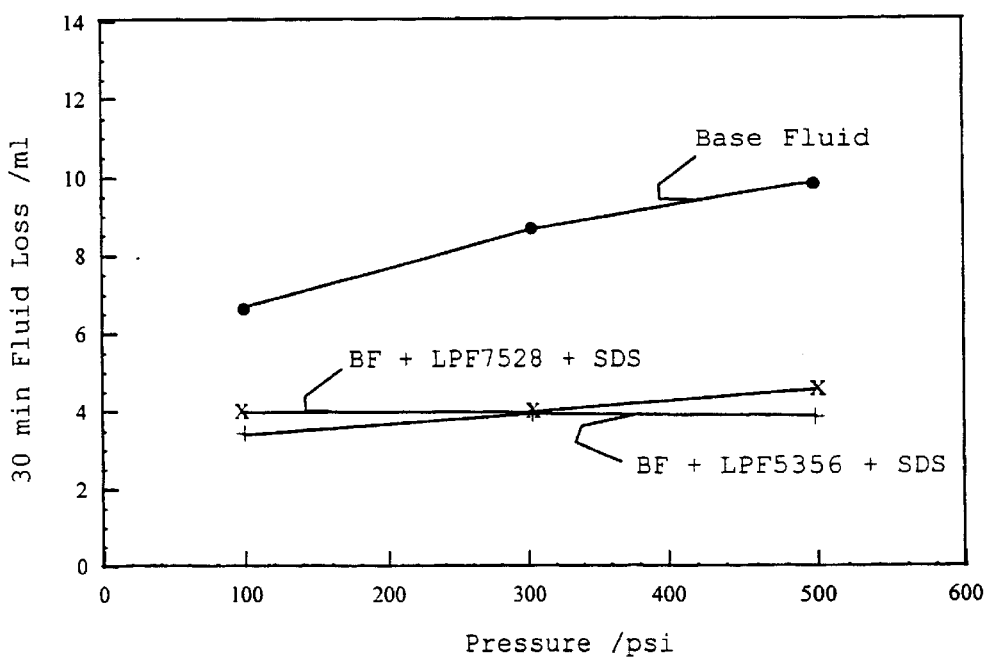
FIG. 2 compares the performance of agglomerated and non-agglomerated SBR latices showing the cumulative fluid loss at 30 minutes at 25C as a function of applied pressure.

Similar results were obtained with LPF7528 of GOODYEAR's Pliolite series, having an average particle size of 150 nm. FIG. 2 compares filtration performance of LPF7528 to LPF5356 at 25C both stabilized with ionic surfactant SDS, again at 10% of latex concentration.

Further examples, coded LS1 and LS2, are styrene-acrylate-methacrylate latices of GOODYEAR's Pliotec range of commercial latices with a size of ~150 nm diameter which by varying the ratio of the different monomers vary in Tg between 59 and 0, respectively. At ambient temperature all are stable with respect to other solids and need no additional stabilisers.

Figure 3:
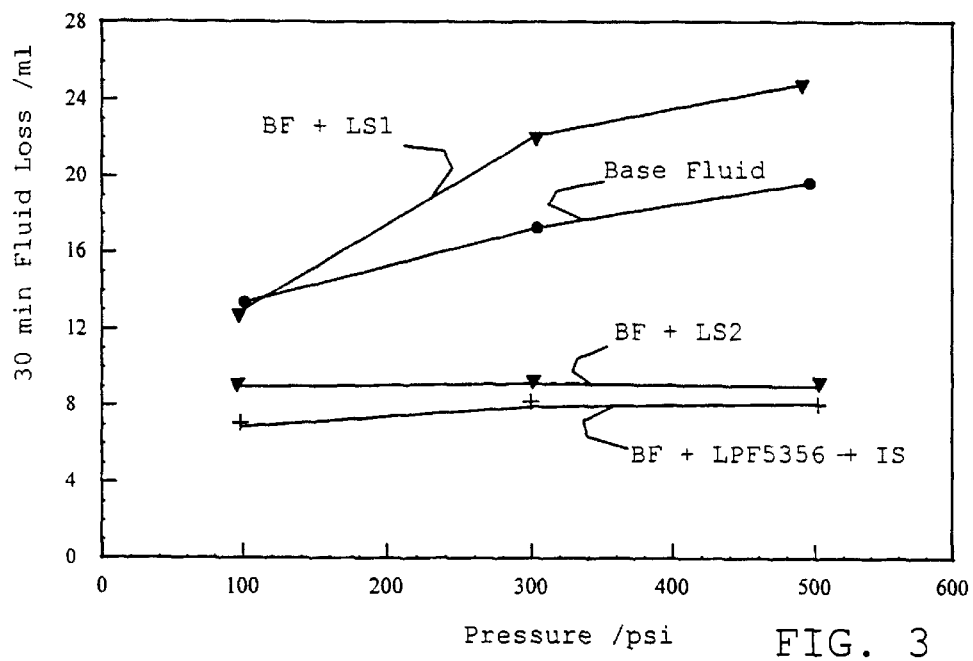
FIG. 3 shows the cumulative fluid loss at 30 minutes at 25C as a function of applied pressure for SA and SBR latices.
Figure 4:
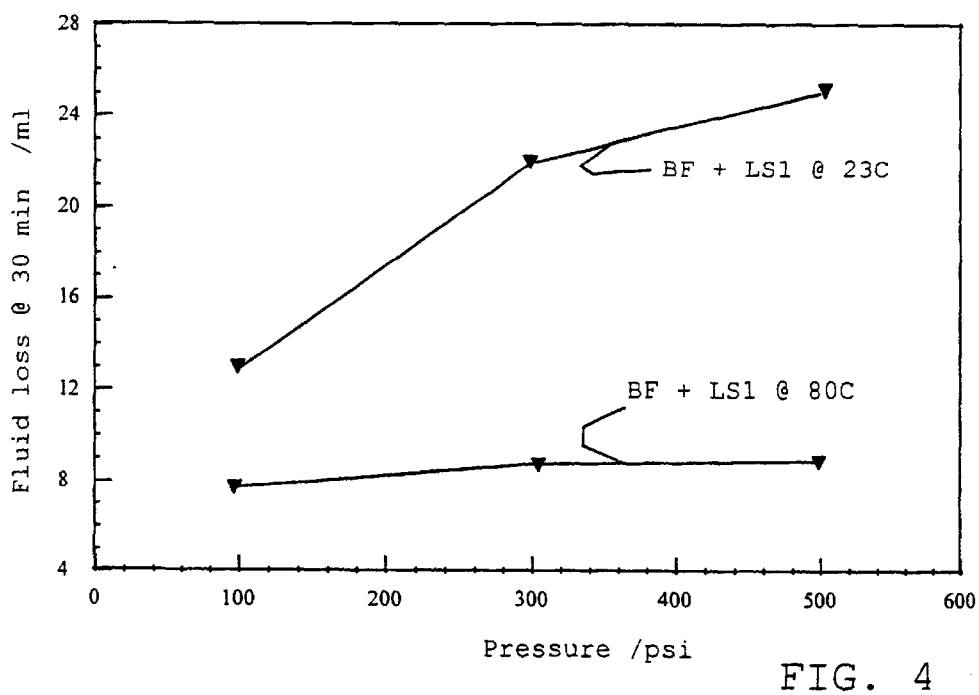
FIG. 4 illustrates the effect of Temperature on performance of glassy polymer comparing the filtration performance from SA type latex at 25 and 80C (above and below Tg=59C)

FIG. 3 summarizes their performance added as 3.5% active to the barite weighted base system. The latex LS2 having a lower than ambient Tg performs well. LS1 that has a Tg of 59C performs badly. In its glassy state the particle does not deform to pack well within the filter cake. If the test is repeated above its Tg, at 80C, it performs in similar fashion to the other latices, see FIG. 4. As the latex LS1 was destabilized at elevated temperature, surfactant SDS was added to the formulation at a concentration of 0.35% (10% of the latex concentration).

Figure 5:
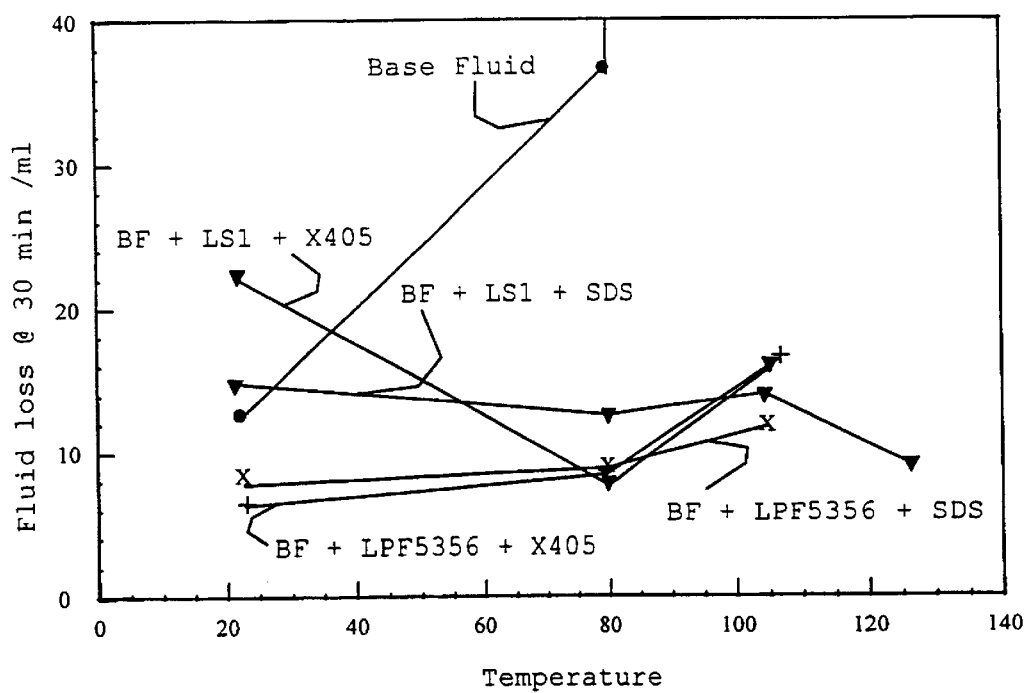
FIG. 5 illustrates the effect of temperature on fluid loss in latex systems using a barite/Xanthan composition as base fluid.

It is generally found that fluid loss increases with increasing temperature. In addition the polymeric additives will degrade at high temperatures. FIG. 5 shows the effect of temperature on various latex systems in the barite weighted Xanthan gum base fluid. The base system shows rapid loss of filtration control by 80C. In general, the latex systems show a much smaller increase in fluid loss over this range. The high Tg latex LS1 shows improved fluid loss at elevated temperatures. Other system limitations appear at higher temperatures, in particular the nonionic surfactant is no longer an effective stabilizer above 105C, resulting in flocculation of the latex It was found that the ionic surfactants, and the ionic polymer D135 continued to stabilize the polymers above this temperature. A further problem occurred with the Xanthan gum that also begins to lose performance at around 105–110C causing barite sag. Scleroglucan biopolymer is stable to higher temperatures. 8 g/l scleroglucan (Biovis) / 160 g/l API barite based systems containing SA and SBR latex with various stabilizers were hot rolled at 120C overnight (16h). HPHT fluid loss was measured at 120C before and after aging. Table 1 summarizes the results. No barite sag was observed in any of the systems. In this system the latice latex is slightly less affected than the SBR latex as is expected from their relative performance at temperature.

TABLE 1

30 minute HPHT fluid loss after aging overnight (16 h) at 120° C.

| System | Fluid loss | |
|---|---|---|
|  | Before ageing | After ageing |
| LPF7528 + SDS | 8.8 | 12.8 |
| LPF7528 + AOT | 9.2 | 10 |
| LPF7528 + NPE | 7.6 | 8.4 |
| LS1 + SDS | 6.4 | 7.2 |
| LS1 + AOT | 10.6 | 10 |
| LS1 + NPE | 6.4 | 7.2 |
| Base System | 20.8 | 240 |

The examples given so far are for fresh water systems. The latices are also stable to added salt. Tests performed in the presence of 5% KCl or NaCl show no difference from results shown above. The latex is also stable in 25% $CaCl_2$ brine.

Additional test were performed to evaluate formation damages caused by the novel additives. The test method used has been described by L J Fraser, P Reid, D Williamson, and F Enriquez Jr in: "Mechanistic investigation of the formation damaging characteristics of mixed metal hydroxide drill-in fluids and comparison with polymer-base fluids". SPE 30501. SPE Annual Technical Conference and Exhibition, Dallas, Tex. USA, Oct. 22–25, 1995.

Following the described method, a 25.4 mm diameter, 30 mm long Clashach sandstone core was presaturated under vacuum with a synthetic connate water formulation, given in table 2.

TABLE 2 composition of connate water

| Salt | Concentration g/Litre |
|---|---|
| NaCl | 56.369 |
| $CaCl_2.2H_2O$ | 6.027 |
| $MgCl_2.6H_2O$ | 2.46 |
| KCl | 1.137 |
| $NaHCO_3$ | 1.332 |
| $CH_3COOH$ | 0.244 |

Permeability to kerosene was determined at residual water saturation. 100 pore volumes of kerosene (~350 g) were flooded through the core at the maximum pressure used in the test, 10 psi. Then the flow rate was determined for 3 applied pressures: 10, 5 and 2 psi. The core was then mounted in a filter cell and exposed to drilling fluid for 4 hours at 300 psi differential pressure, the filtration direction being opposite direction to permeability flow. After filtration the level of permeability damage was determined. To quantify damage, first clean up tests were performed by flowing kerosene through at 2, 5 and 10 psi, waiting until equilibrium flow rates were achieved before stepping up to the next pressure. These equilibrium flow rates were compared to the initial flow rates at these pressures. Then after clean up at 10 psi, the three point permeability was again determined and a % retained permeability was calculated from the difference between the final and initial permeabilities, % Kf/Ki.

Formation damage tests were performed on carbonate weighted drilling fluids. The base system was 8 g/l scleroglucan (Biovis) and 360 g/l carbonate Idcarb 150. pH was adjusted to 9 with NaOH. To this were added fluid loss additives: either PAC at 5 g/l or latices LPF7528 or LS1 at 3.5% active, with various stabilizers: surfactants SDS, AOT, and the polymeric stabilizer NPE at 10% of the latex concentration. Tests were carried out at ambient temperature and at 120C. Table 3 summarizes performance.

TABLE 3

Formation Damage tests on Clashach core. % Retained permeability and clean up after exposure to drilling fluid. 4h filtration, ΔP300 psi at 25° C. and 120° C.

| Fluid Loss Additive | Filtration Temperature ° C. | Fluid Loss g | Initial Permeability mD | Return Permeability % | % Clean-up | | |
|---|---|---|---|---|---|---|---|
| | | | | | 2 psi | 5 psi | 10 psi |
| LPF7528 + NPE | 25 | 2.66 | 583 | 56 | 7 | 69 | 65 |
| LPF7528 + AOT | 25 | 0.62 | 599 | 61 | 18 | 38 | 60 |
| PAC | 25 | 5.28 | 570 | 62 | 18 | 8 | 60 |
| LPF7528 + AOT | 120 | 9.83 | 690 | 76 | 3 | 56 | 73 |
| LS1 + NPE | 120 | 5.27 | 817 | 65 | 22 | 39 | 61 |
| LS1 + SDS | 120 | 5.56 | 707 | 90 | 5 | 57 | 85 |
| LS1 + AOT | 120 | 5.25 | 556 | 69 | 30 | 56 | 66 |
| PAC | 120 | 18.86 | 714 | 49 | 3.5 | 24 | 49 |

The latex combinations show much improved fluid loss over the conventional PAC polymer. In particular, it can be clearly seen from table 3 that the PAC filtration performance is significantly degraded at 120C, whereas the latex formulations remain effective. The SBR latex gives similar permeability damage to PAC at room temperature, and improves at elevated temperature. The SA type latices are very low damaging, particularly in combination with the anionic surfactant SDS, where return permeabilities are ~90%. The polyanionic stabilizer NPE is slightly more damaging than the surfactant stabilizers. The ease of clean up should also be noted, with the SA latices achieving high clean up at low pressure. In most cases the SA latex cake cleanly detached from the core face. The SBR latex cakes were more dispersive tending to pinhole, as do filter cakes formulated with conventional polymers.

What is claimed is:

1. A method for drilling a borehole wherein an aqueous drilling fluid is circulated within said borehole while drilling, comprising circulating in said borehole with said aqueous drilling fluid an effective amount of an additive consisting of a latex compound which is essentially insoluble and non-swellable in water, the glass transition temperature of the latex compound being lower than the temperature of the drilling fluid within said borehole.

2. The method of claim 1 wherein the latex is serving as fluid loss agent.

3. The method of claim 1, further comprising the step of letting the latex form at least part of a filter cake within the borehole.

4. The method of claim 1 wherein the latex is added as a polymer suspension to the drilling fluid.

5. The method of claim 1 wherein the latex is added as a polymer suspension to the drilling fluid with a given particle size or particle size distribution and essentially maintains said particle size or particle size distribution within the drilling fluid and as deposit within a filter cake.

6. The method of claim 1 wherein the latex is added as a polymer suspension to the drilling fluid and is partially deposited so as to form a part of a filter cake essentially without undergoing further agglomeration, coagulation, crosslinking or water induced swelling.

7. The method of claim 1 wherein up to 20 volume per cent of latex suspension are added to said aqueous drilling fluid.

8. The method of claim 1 wherein said aqueous composition further includes viscosifying additives.

9. The method of claim 1 wherein said aqueous composition further includes sufficient suspended, firmly divided solids to form a filter cake on the wall of said borehole.

10. The method of claim 9 wherein said finely divided solids include clayey material.

11. The method of claim 1 further comprising the steps of:
preparing the aqueous drilling fluid;
pumping said fluid through a tubular structure with a drill bit at a bottom end; and
returning said fluid through an annulus between the tubular structure and the wall of the borehole to the surface.

12. The method of claim 1 wherein the latex compound has a glass transition temperature in the range from −20 to 59° C.

13. A composition useful as a drilling fluid in drilling a borehole comprising:

an aqueous carrier;

an effective amount of an additive consisting of an essentially insoluble and non-swellable latex compound, the latex compound having a glass transition temperature in the range from −20 to 59° C.; and sufficient suspended, finely divided solids to form together with said latex a filter cake on the wall of said borehole.

14. The composition of claim 13 wherein said composition comprises up to 20 weight per cent of said latex compound.

* * * * *